(12) United States Patent
Oksman

(10) Patent No.: US 9,025,449 B2
(45) Date of Patent: May 5, 2015

(54) NETWORK RETRANSMISSION PROTOCOLS USING A PROXY NODE

(71) Applicant: Infineon Technologies AG, Neubiberg (DE)

(72) Inventor: Vladimir Oksman, Morganville, NJ (US)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 13/917,920

(22) Filed: Jun. 14, 2013

(65) Prior Publication Data
US 2013/0283109 A1 Oct. 24, 2013

Related U.S. Application Data

(63) Continuation of application No. 12/433,819, filed on Apr. 30, 2009, now Pat. No. 8,493,855.

(60) Provisional application No. 61/165,303, filed on Mar. 31, 2009.

(51) Int. Cl.
| | |
|---|---|
| H04L 1/00 | (2006.01) |
| H04L 12/26 | (2006.01) |
| G01R 31/08 | (2006.01) |
| G06F 11/00 | (2006.01) |
| G08C 15/00 | (2006.01) |
| H04L 1/16 | (2006.01) |
| H04L 1/18 | (2006.01) |
| H04L 12/54 | (2013.01) |

(52) U.S. Cl.
CPC ............ *H04L 1/1621* (2013.01); *H04L 1/1854* (2013.01); *H04L 12/56* (2013.01); *H04L 2001/0097* (2013.01)

(58) Field of Classification Search
USPC .............. 370/229, 230, 230.1, 231, 232, 233, 370/234, 349, 351, 401, 431, 432, 464, 474, 370/901, 902, 912, 913
See application file for complete search history.

(56) References Cited

U.S. PATENT DOCUMENTS

| | | | |
|---|---|---|---|
| 5,459,725 A | 10/1995 | Bodner et al. | |
| 6,522,650 B1 * | 2/2003 | Yonge et al. | 370/390 |
| 6,643,813 B1 * | 11/2003 | Johansson et al. | 714/748 |
| 6,678,249 B2 * | 1/2004 | Toskala et al. | 370/236 |

(Continued)

OTHER PUBLICATIONS

"G.hn: PHY Level Retransmission for Multicast Traffic"; ITU—Telecommunication Standardization Sector, CopperGate Communications, Temporary Document 0PC-023, Pruneyard, California, Jul. 21-25, 2008, 3 pages.

(Continued)

*Primary Examiner* — Kwang B Yao
*Assistant Examiner* — Adam Duda
(74) *Attorney, Agent, or Firm* — Eschweiler & Associates, LLC

(57) ABSTRACT

One embodiment relates to a device. The device includes reception circuitry adapted to receive a data unit from a first node of a network and a confirmation message signal from a second node of the network. Analysis circuitry is adapted to determine a failure to correctly receive the data unit. Transmission circuitry is adapted to transmit a negative acknowledgement signal to the first node in case the analysis circuitry determines the data unit has not been correctly received and the confirmation message signal from the second node is received. Other methods and devices are also disclosed.

13 Claims, 7 Drawing Sheets

(56) References Cited

U.S. PATENT DOCUMENTS

| | | | |
|---|---|---|---|
| 6,775,533 B2 * | 8/2004 | Kakani et al. | 455/403 |
| 6,778,509 B1 * | 8/2004 | Ravishankar et al. | 370/322 |
| 6,907,005 B1 * | 6/2005 | Dahlman et al. | 370/236 |
| 7,023,803 B2 * | 4/2006 | Kakani et al. | 370/235 |
| 7,372,831 B2 * | 5/2008 | Kim et al. | 370/328 |
| 7,447,148 B2 * | 11/2008 | Gao et al. | 370/216 |
| 7,813,322 B2 | 10/2010 | Laroia et al. | |
| 8,023,463 B2 * | 9/2011 | Dick et al. | 370/331 |
| 2002/0064167 A1 * | 5/2002 | Khan et al. | 370/410 |
| 2006/0045010 A1 * | 3/2006 | Baker et al. | 370/230 |
| 2006/0198325 A1 | 9/2006 | Gao et al. | |
| 2006/0274644 A1 | 12/2006 | Budampati et al. | |
| 2007/0002858 A1 * | 1/2007 | Bichot et al. | 370/390 |

OTHER PUBLICATIONS

"G.hn: Partial Acknowledgement for Broadcast and Multicast Frames"; ITU—Telecommunication Standardization Sector, Intelion Corporation, Spidcom, Temporary Document 09NT-031, Nashville, Tennessee Mar. 16-20, 2009, 5 pages.

Non-Final Office Action dated Apr. 27, 2012 in connection with U.S. Appl. No. 12/433,819.

Final Office Action dated Nov. 23, 2012 in connection with U.S. Appl. No. 12/433,819.

Notice of Allowance dated Jun. 18, 2013 in connection with U.S. Appl. No. 12/433,819.

* cited by examiner

NETWORK RETRANSMISSION PROTOCOLS USING A PROXY NODE

RELATED APPLICATIONS

This application is a Continuation of U.S. patent application Ser. No. 12/433,819 filed Apr. 30, 2009 entitled "Network Retransmission Protocols Using a Proxy Node" which claims priority to U.S. Provisional Application Ser. No. 61/165,303 filed Mar. 31, 2009 and is hereby included in its entirety.

FIELD

The present disclosure relates to generally to communication networks and more particularly to local area networks, such as home networks, for example.

BACKGROUND

In today's business climate, industry fortunes rise and fall on whether information is exchanged in an efficient manner. For example, cell phones, pagers, and the Internet have thrived because each technology allows businesses to exchange information over a network. Therefore, to satisfy our society's need for efficient exchange of information, there is an on-going need for improvements in networks.

SUMMARY

The following presents a simplified summary of the disclosure in order to provide a basic understanding of some aspects of the disclosure. This summary is not an extensive overview of the disclosure, and is neither intended to identify key or critical elements of the disclosure nor to delineate the scope of the disclosure. Rather, the purpose of the summary is to present some concepts of the disclosure in a simplified form as a prelude to the more detailed description that is presented later.

One embodiment relates to a device. The device includes reception circuitry adapted to receive a data unit from a first node of a network and a confirmation message signal from a second node of the network. Analysis circuitry is adapted to determine a failure to correctly receive the data unit. Transmission circuitry is adapted to transmit a negative acknowledgement signal to the first node in case the analysis circuitry determines the data unit has not been correctly received and the confirmation message signal from the second node is received.

The following description and annexed drawings set forth in detail certain illustrative aspects and implementations of the disclosure. These are indicative of but a few of the various ways in which the principles of the disclosure may be employed.

DETAILED DESCRIPTION

Figure 1:
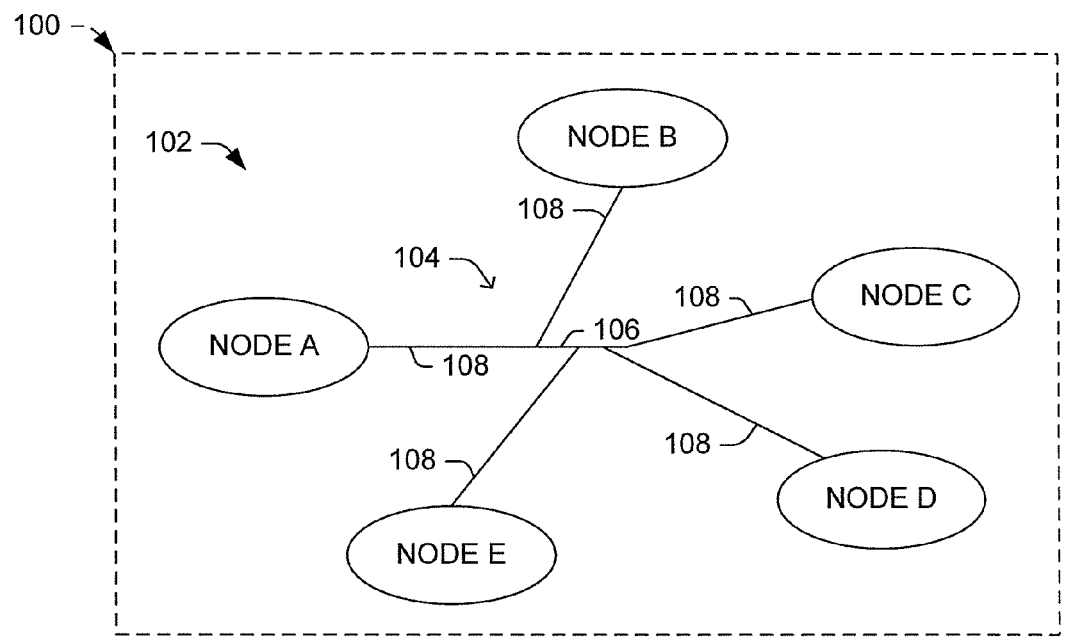
FIG. 1 illustrates one embodiment of a network that transmits data between multiple nodes over a transmission medium.

The present disclosure will now be described with reference to the drawings wherein like reference numerals are used to refer to like elements throughout, and wherein the illustrated structures are not necessarily drawn to scale. Although various illustrated embodiments are described and illustrated as a hardware structure, the functionality and corresponding features of the present system can also be performed by appropriate software routines or a combination of hardware and software. Thus, the present disclosure should not be limited to any particular implementation and can be construed to cover any implementation that falls within the spirit and scope of the claims. Nothing in this detailed description is admitted as prior art.

FIG. 1 illustrates a network 100, such as a local area network, which comprises several nodes 102. These nodes 102 are coupled to a transmission medium 104 over which they send and/or receive signals. The transmission medium 104 can comprises a wireless transmission medium, wireline transmission medium, or combinations thereof. In some embodiments, the transmission medium 104 may comprise a trunk 106 from which a number of branches 108 extend, where each branch 108 carries signals to and from a different node 102.

In one embodiment, the network 100 could be a home network that distributes broadband services from an access network (not shown) to the nodes 102. Thus, in some embodiments, each node 102 comprises a TV set, computer, videoconferencing device, modem, music device, phone, and/or some other network device. In such embodiments, the transmission medium 104 may include home wiring such as home phone lines (e.g., twisted pair of copper wires), coaxial cable lines, electrical power lines, and/or dedicated home network wiring, among others. In such embodiments, one of the nodes 102 can be associated with a residential gateway (RG), which, in turn, is connected to an access network termination at the customer premises (usually a "CPE modem" or simply "CPE").

Communication within the network 100 is structured to limit the impact of interference between nodes 102. One manner in which communication is structured is by employing a multi-carrier communication channel, which may use various types of multi-carrier communication, such as orthogonal frequency division multiplexing (OFDM), among others. Multi-carrier modulation breaks the frequency spectrum over which the nodes 102 communicate into a series of frequency channels, which may also be referred to as sub-carriers. Separate time slots and/or frequency channels are assigned to the respective nodes to limit interference between nodes.

Within the network 100, several types of communications can be used to exchange data units, including: unicast, multicast, and broadcast transmissions. Data units can include frames (e.g., Ethernet frames), packets (e.g., IP packets), or other types of data units.

Figure 2:
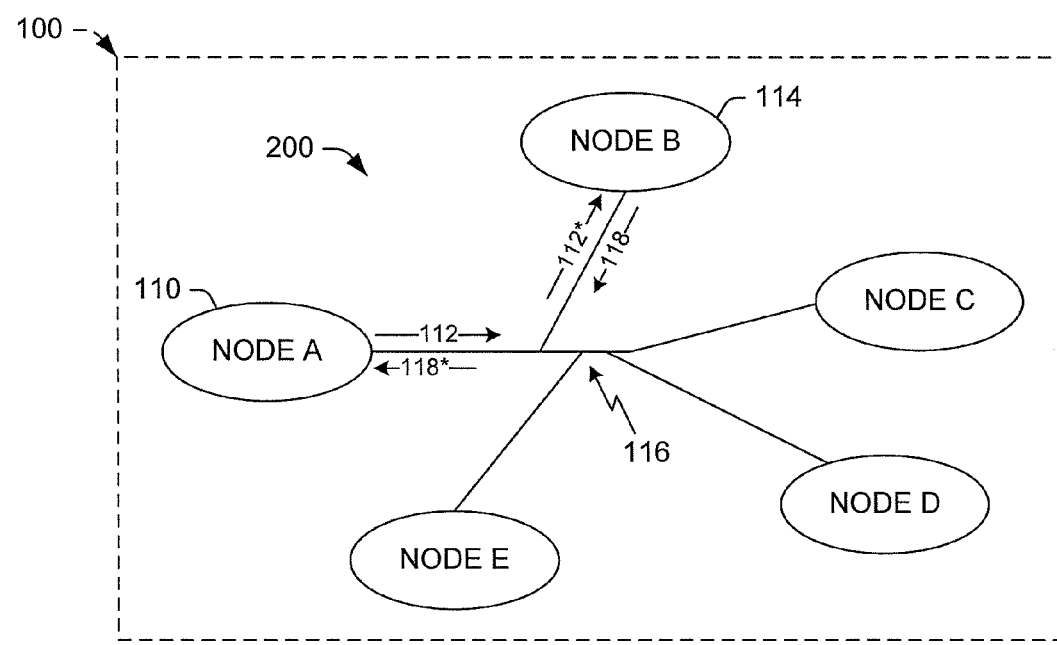
FIG. 2 illustrates one embodiment of unicast transmission protocol over the network.

FIG. 2 shows an example of unicast transmission protocol 200, where a source node 110 (e.g., Node A) sends a transmission data unit 112 to a single destination node 114 (e.g., Node B). Often, the transmission data unit 112 identifies the destination node 114 by its network address, such as an MAC address or hardware identification number, but it can also identify the destination node 114 by transmitting on a channel reserved for communication between the source node and destination node (e.g., a reserved time slot or a reserved frequency band).

A reception data unit 112*, which corresponds to the transmission data unit 112, is then received at the destination node. Because noise 116 on the transmission medium may create erroneous data in the reception data unit 112*, the destination node 114 checks the reception data unit 112* for errors. If no errors are found (or if there are errors, but they are correctable via redundancy information in the reception data unit 112*), the destination node 114 sends an transmission acknowledgement (ACK) 118 to the source node 110. If the source node 110 does not receive a reception ACK 118* within a certain time period, the source node 110 retransmits the transmission data unit 112 and waits for another reception ACK 118*. This transmission and acknowledgement procedure can continue in an iterative fashion until the transmission data unit 112 is eventually delivered to the destination node 114, thereby achieving reliable communication. Alternatively, if the retransmission attempts exceed some predetermined time or count value, retransmission can be stopped. Although this unicast transmission protocol is effective, it is inefficient if data needs to be transmitted to several different nodes in the network. Multicast transmission protocols, where data is transmitted to several nodes at once, may be useful in such a scenario. One particular type of multicast transmission is broadcast transmission, where the data is transmitted to all nodes in the network.

Figure 3:
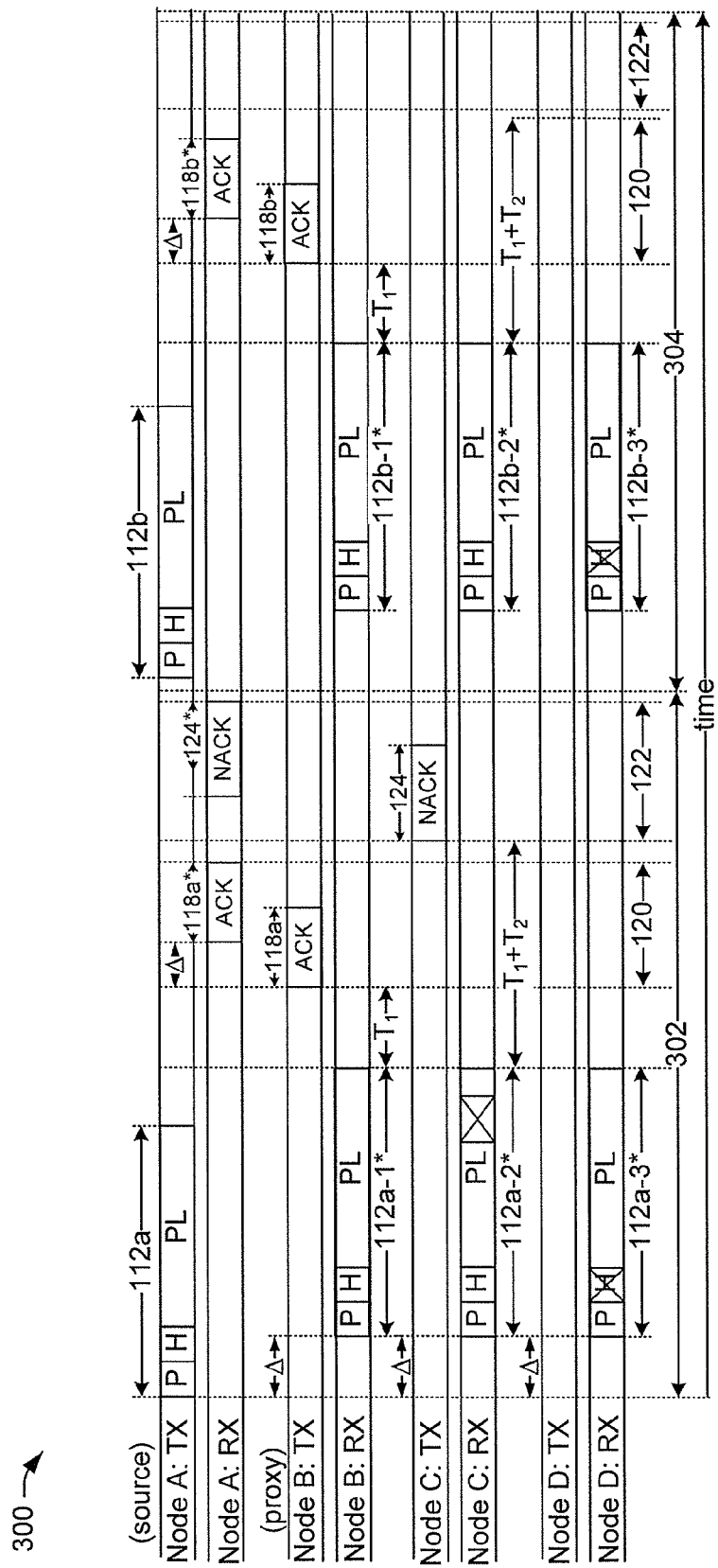
FIG. 3 shows one embodiment of a multicast retransmission protocol that uses a proxy node.

FIG. 3 shows an example of a multicast transmission protocol 300. The multicast communication protocol 300, which includes an initial transmission/acknowledgement cycle 302 and one or more re-transmission/acknowledgement cycle(s) 304, is carried out between a source node (e.g., Node A) and several destination nodes (e.g., Nodes B, C, and D). The intention of the retransmission protocol in case of multicast is to make sure that all nodes of the multicast group receive the data error-free. If at least one node received uncorrectable data, the data is retransmitted.

The destination nodes are divided between a proxy node (e.g., Node B) and several other destination nodes (e.g., Node C, Node D).

As will be appreciated in more detail below, this multicast transmission protocol 300 is particularly useful when noise in the network is analyzed and the proxy node is selected as the destination node experiencing the highest level of noise relative to a given source node. This can be advantageous because it gives the source node a good measure of whether a transmission data unit has been transmitted successfully to all the intended destination nodes. To put it simply, the network is betting that if the "worst" node (proxy node) receives a transmission data unit correctly, it is pretty likely (although not guaranteed) that other destination nodes have also received the transmission data unit correctly. Nonetheless, even if the noise level is estimated correctly and the node with the highest noise level is selected as a proxy, this still doesn't guarantee that all other nodes received data correctly (or even received the data at all). The latter often happens because of impulse noise hitting data frame headers: as the header is corrupted, the destination address becomes unreadable, and node can't receive the packet. By this reason, even when proxy node receives data properly, there might be other nodes that receive the data in error or don't receive the data at all.

FIG. 3's diagram starts when a source node (e.g., Node A) initially transmits a multicast transmission data unit 112a to several destination nodes (e.g., Node B, Node C, and Node D). The transmission data unit 112a includes a preamble (P), a header (H), and payload data (PL). The preamble often comprises a signal pattern, such as a predetermined phase pattern, which identifies the start of the transmission data unit 112a. The header includes the source node address, at least one destination node address, the duration or length of the transmission data unit, as well as other data unit control information (e.g., sequence number, constellation encoding, forward error correction parameters). In this example, the source address identifies Node A, and the destination address identifies the nodes of the multicast group intended to receive the transmission data unit 112a (e.g., Nodes B, C, and D). The destination address may list the respective addresses of the destination nodes or may include a single address that is associated with the multicast group. In some embodiments, the destination address could be that of the source, which can indicate that the transmission data unit 112a is a broadcast data unit intended for all nodes in the network, for example.

After the transmission data unit 112a is transmitted, some delay, Δ occurs before reception data units 112a* are respectively received at the other nodes. For example, in the illustrated example, reception data units 112a-1*, 112a-2*, and 112a-3*, are received at Node B, Node C, and Node D, respectively. Although only a single delay, Δ is illustrated for all nodes for purposes of simplicity and clarity of understanding, in practical implementations each node can receive its respective reception data unit with a delay that is different from the other nodes relative to the source node.

In any event, after the destination nodes receive their respective reception data units (which may now include erroneous data due to noise in the network 100), each destination node analyzes its reception data unit and makes a determination whether its reception data unit includes uncorreable data. In the illustrated example, Node B has determined that reception data unit 112a-1* is correct; while Node C and Node D have determined that reception data units 112a-2* and 112a-3*, respectively, include uncorrectable data (as indicated by the "X" blocks).

The proxy node, Node B, is selected to transmit an acknowledgement (ACK) 118a addressed to the source node, such as a message or a signal having a predefined voltage level or phase, based on whether its reception data unit includes uncorrectable data. In the illustrated example, because the proxy node (Node B) receives the reception data unit 112a-1* correctly, Node B transmits ACK 118a onto the transmission medium 104 during a first time slot 120. By contrast, if the proxy node had determined the reception data unit 112a-1* included uncorreable data, the proxy node could have remained silent without transmitting an ACK 118 during the first time slot 120. In the illustrated example, the first time slot 120 starts at some time T1 after the proxy node receives the end of the reception data unit 112a-1*, although the first time slot 120 could also start at some other agreed upon time.

In the event that one or more of the other non-proxy nodes has received uncorrectable data in the reception data unit 112a*, there is also a second time slot 122 during which the other non-proxy nodes can transmit respective negative acknowledgements (NACK) 124. For example, Node C has received uncorrectable data in reception data unit 112a-2* and consequently transmits NACK 124 during the second time slot 122. To increase the likelihood of the NACK being successfully received, NACKs may be transmitted several times or may use signals with increased robustness. In the first case, retransmission of the NACK may be initiated by the source sending a "retransmit NACK" command to the destination nodes.

Consequently, if the source node receives ACK signal 118a\* during the first time slot 120 and does not receive NACK 124\* during the second time slot 122, multicast transmission of transmission data unit 112a is considered to be successful. On the other hand, if the source node doesn't receive an ACK signal during the first time slot 120 or receives a NACK signal during the second time slot 122, the transmission is considered to be unsuccessful and the payload data of transmission data unit 112a is retransmitted in transmission data unit 112b during retransmission/acknowledgement cycle 304. Thus, in an effort to reliably transmit the transmission data unit 112a, the right-hand side of FIG. 3 shows transmission of a second transmission data unit 112b, which contains the same payload data as transmission data unit 112a.

The multicast transmission protocol of FIG. 3 is beneficial in one respect because it allows the network 100 to get a pretty good idea as to whether all nodes of the multicast group have correctly received a multicast transmission, based on whether the proxy node has sent an ACK 118a. This is largely due to the fact the proxy node is characterized as the "worst" node with regards to noise. However, this acknowledgement scheme is still not completely reliable, because it doesn't adequately deal with the case when one or more nodes simply do not receive a data unit (or cannot properly determine a data unit is intended for them). For example, Node D in the illustrated example of FIG. 3 receives two consecutive reception data units 112a-3\*, 112b-3\* in which the header (e.g., destination address) is damaged by noise. Consequently, Node D simply ignores the reception data units 112a-3\*, 112b-3\* because it doesn't realize it is an intended recipient. Therefore, it transmits neither an ACK nor a NACK. As a result, even though the source node assumes that the multicast data unit was transmitted successfully to all nodes on the second transmission attempt during retransmission time 304, Node D did not in fact receive the transmission data unit 112 correctly.

Figure 4:
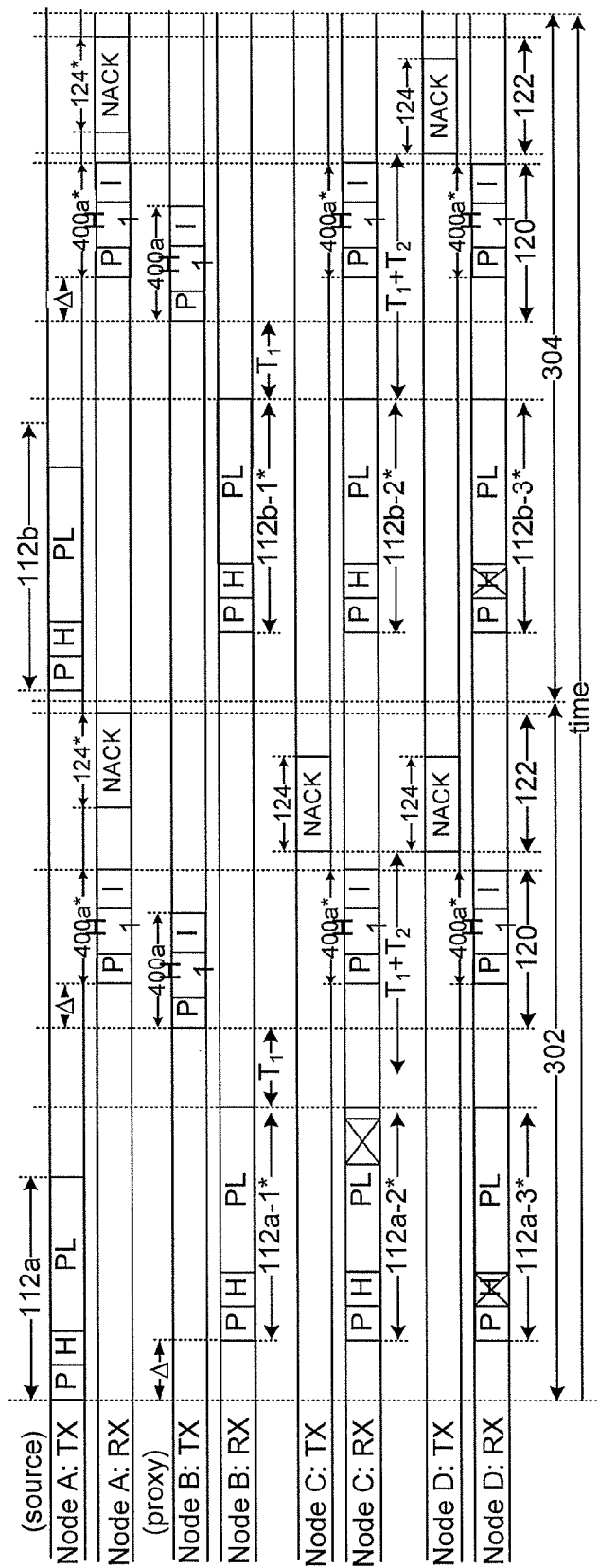
FIG. 4 shows another embodiment of a multicast retransmission protocol that uses a proxy node.

FIG. 4 shows an example of another technique that alleviates some of the shortcomings in FIG. 3's embodiment. Like FIG. 3, FIG. 4 shows an embodiment where Node A is a multicast source and node B is selected as a proxy node. In this embodiment, however, rather than the proxy node sending an ACK as a simple signal, the proxy node sends in multicast one or more confirmation (CONF) messages 400 that include the preamble and header identifying the data unit being acknowledged. Because this more detailed CONF message is sent in multicast to the source node as well as the other destination nodes, it provides the other destination nodes with another opportunity to detect a message was intended for them, thereby increasing the likelihood of reliable transmission.

More specifically in FIG. 4, the source node transmits transmission data unit 112a, which is then received as reception data units 112a-1\*, 112a-2\*, 112a-3\* at Nodes B, C, and D, respectively. Proxy node B correctly receives reception data unit 112a-1\*, but other destination nodes C and D receive reception data units 112a-2\* and 112a-3\*, respectively, having uncorrectable data as indicated by the "X" boxes. Note that although node D receives reception data unit 112a-3\*, it receives it with a corrupted header and therefore does not realize it is an intended recipient.

During the first time slot 120, proxy node B transmits a CONF message 400a, which includes a preamble (P), an optional header (H1) and an identifier (I) that identifies the reception data unit 112a-1\*, which was correctly received. In some embodiments, for example, the identifier could comprise a header (H) of the reception data unit 112a-1\*, but other identifiers could also be used. In addition, although not explicitly shown in the FIG. 4, this CONF message 400a may also contain payload data information corresponding to transmission data unit 112a. Because the destination address in header H1 of the CONF message 400a specifies all nodes in the multicast group, the other destination nodes analyze received CONF messages 400a\*.

Notably, Node D ignored reception data unit 112a-3\* because its header (e.g., destination address) was incorrect. However, Node D, upon analyzing CONF message 400a\* realizes that it missed a transmission data unit 112a on which it was an intended recipient. Therefore, during the second time slot 122, Node D transmits an NACK 124 because it has discerned, based on the received CONF message 400a\*, that it missed a data unit for which it was an intended recipient. Therefore, as can be appreciated by comparing FIG. 3 and FIG. 4 (which have the same noise pattern and in which Node D ignores reception data unit 112a-3\* because of the corrupted header), FIG. 4's protocol provides more reliable retransmission because Node D is now capable of detecting that it missed the data unit 112a based on its succesful reception of CONF 400a\*.

For completeness in FIG. 4, note that during the second time slot 122, Node C transmits a NACK 124 because reception data unit 112a-2\* included uncorrectable data. Note that these NACKs, although illustrated as being transmitted during a common timeslot (e.g., the second time slot 122), could also be transmitted during different timeslots.

During retransmission time 304, upon failing to receive the CONF message 400 and/or receiving NACKs 124, which can be a predetermined voltage or phase signal of a particular shape in some embodiments, the source node subsequently retransmits the transmission data unit 112a as transmission data unit 112b. Additional retransmission can also take place until payload data (PL) is successfully exchanged.

It will be appreciated that once a node has correctly received payload data, it will typically not request retransmission of that payload data regardless of whether later retransmissions of the same payload data are received with errors at the node. Thus, if a sergment of payload data has been received properly, but when retransmitted was received with errors, the receiving node will typically not request retransmission again, because the payload segment has already been successfully received.

Notably, although the noise pattern in FIG. 4 is the same as that of FIG. 3, the end result is different. In particular, in FIG. 4 Node D, although still having not yet received the reception data unit 112b\* correctly at the end of the diagram, now transmits a NACK 124 during the retransmission/acknowledgement cycle 304 so that the source node is alerted to the fact that Node D has not yet received the payload data (PL). Thus, Node B can continue to send the payload data in transmission data units until it is properly received by Node D. In contrast, at the end of FIG. 3, node D sat silently without transmitting a NACK in the retransmission/acknowledgement cycle 304, thereby failing to alert the source node of its not having received the payload data.

To increase the probability that the CONF message 400a will be received by all nodes, the proxy node (Node B) may be configured to retransmit the CONF message 400a one or more times, potentially with higher power than other transmitted signals, if regulations allow. The CONF message 400a may also be constructed for higher robustness (noise immunity) due to the small amount of information it carries. One of those includes additional levels of repetition encoding, which are indicated in the CONF message 400a header.

Figure 5:
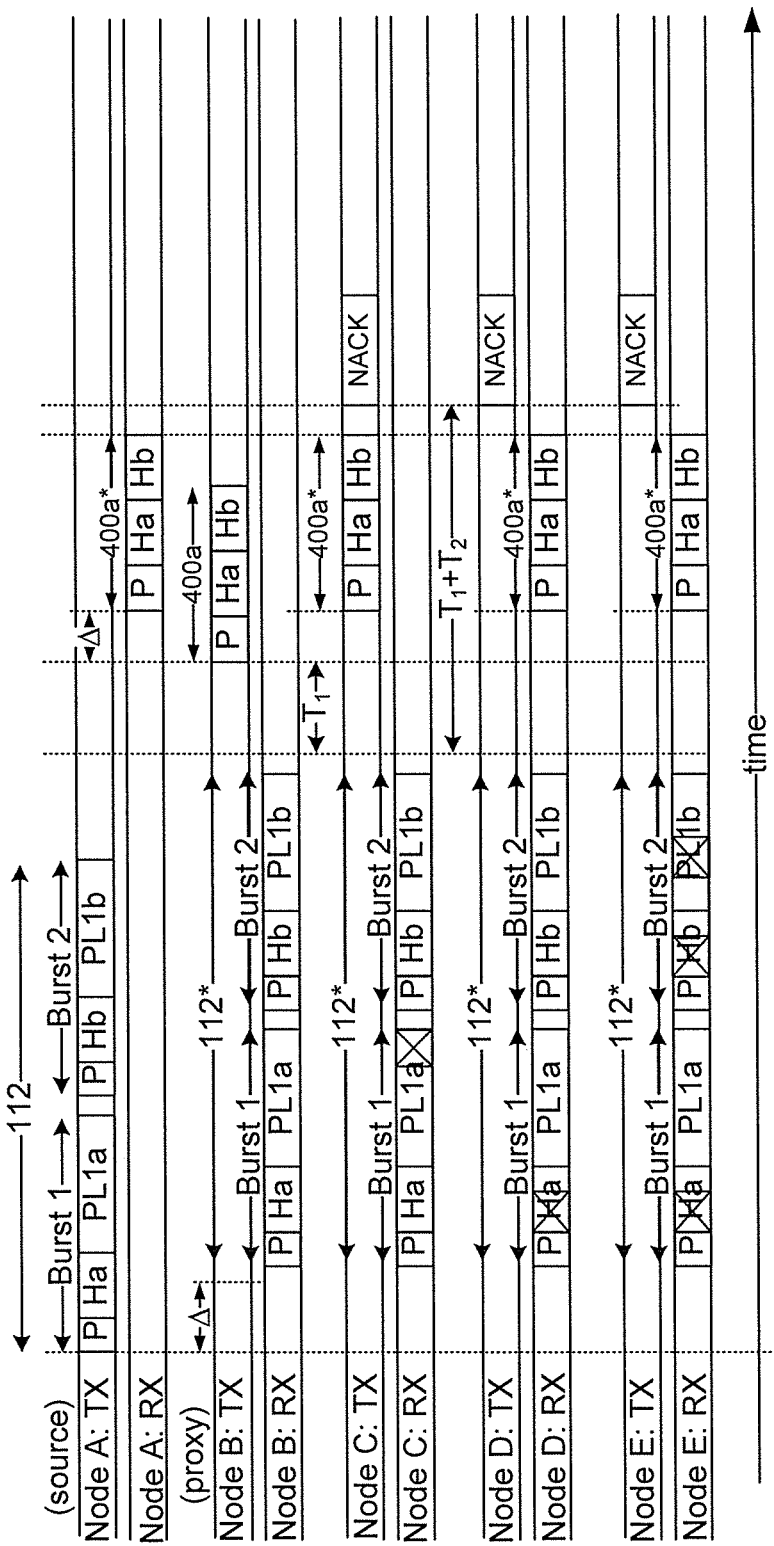
FIG. 5 shows an embodiment of a multicast retransmission protocol that uses a proxy node and employs bursts.

Referring now to FIG. 5, one can see another embodiment in which a transmission data unit 112 is transmitted in two or more parts (bursts), wherein each burst carries the full information about the duration/length of the full transmission data unit 112, the number of bursts, and other relevant parameters. If a particular node was hit by noise and missed the header of the first burst, the node can receive the second burst and issue a NACK associated with the whole data unit or with the second burst. Each burst includes information on how many burst are included in the full transmission data unit 112 and its serial number, so each node may estimate whether it received the full transmission data unit 112 or only some of the bursts.

In the example presented in FIG. 5, Node C receives and analyzes both bursts, but determines that burst 1 includes uncorrectable payload data. Node D receives the payload data of Burst 2, but ignores burst 1 (because the header of Burst 1 is corrupted, so Node D can't recognize it). Node C and Node D both issue a regular NACK. Node E didn't receive either of the two bursts, but it detected the CONF message 400a* transmitted by Node B. Based on Node B's CONF message 400, Node E transmits a NACK T2 time units after Node B's CONF message 400. The timing can be arranged such that the source node only checks one time slot for CONF messages and one time slot for NACK, which reduces overhead for the network.

Although in FIG. 5 a single NACK is send for the two bursts, it is also possible to assign a separate NACK (e.g., separate time slot, separate frequency channel, or separate information field in the NACK) for each burst. For example, a first NACK can identify whether the first burst includes uncorrectable data and the second NACK can identify whether the second burst includes uncorrectable data. Because this potentially limits the amount of data that needs to be retransmitted, it may simplifies the control needed for the nodes. However, when separate NACKS are used and each has a separately reserved timeslot, it also increases the overhead required for transmission, thereby potentially limiting effective data throughput.

Figure 6:
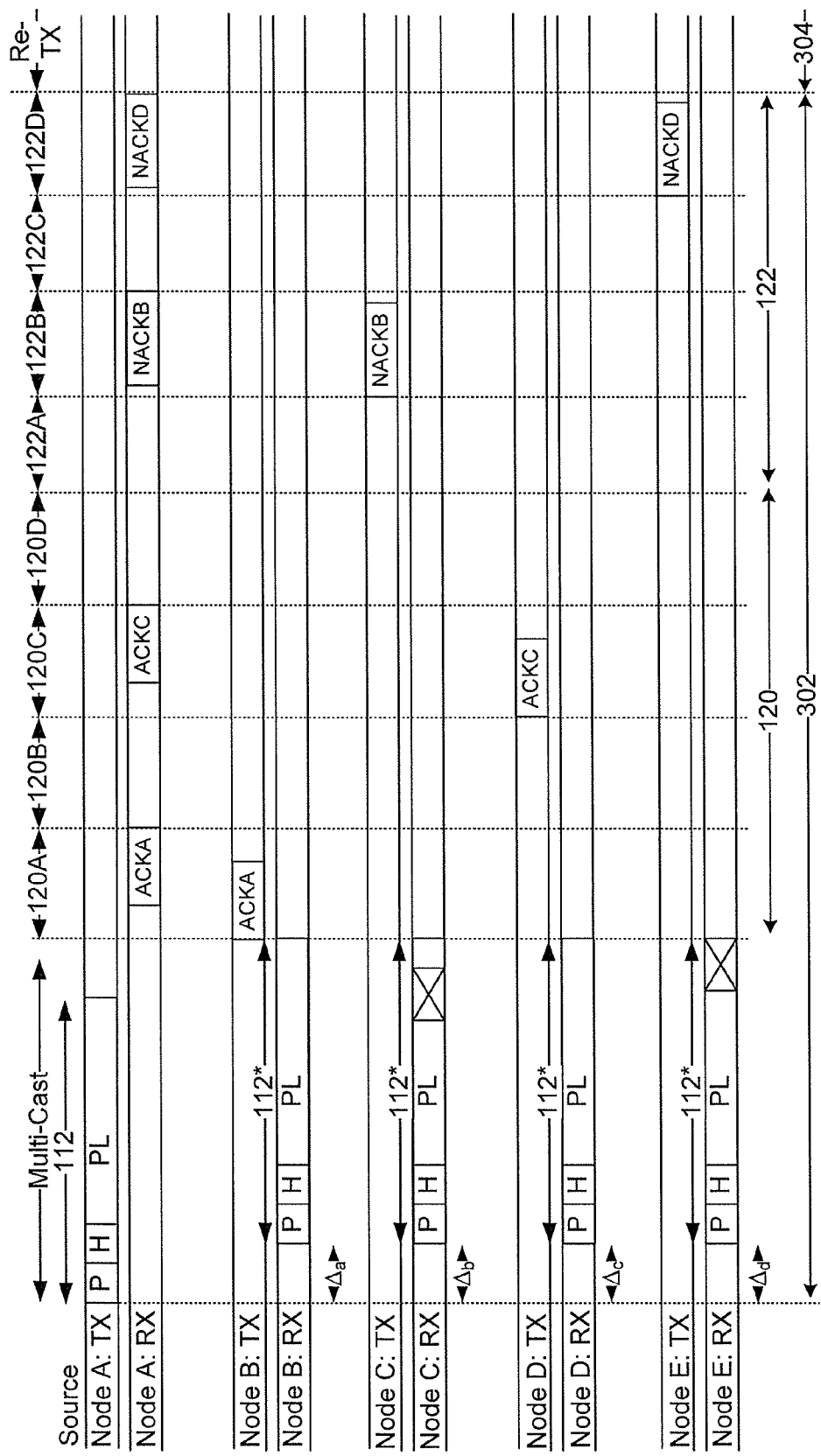
FIG. 6 shows an embodiment of a multicast retransmission protocol in which first and second timeslots are subdivided into timeslots respectively associated with nodes of the network.
Figure 7:
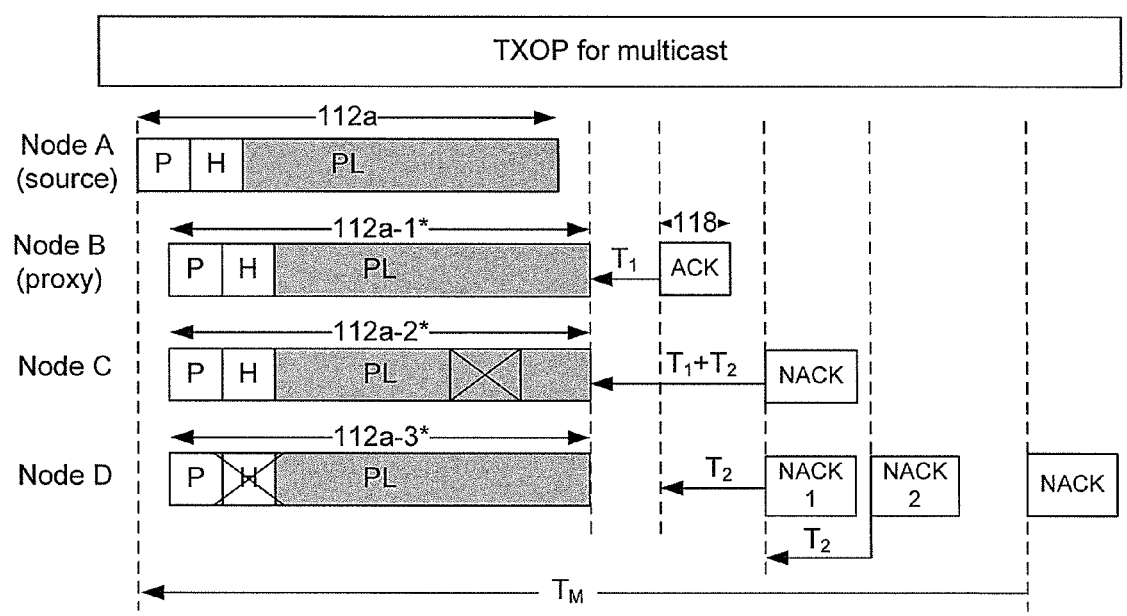
FIG. 7 shows an embodiment of a retransmission protocol that uses a proxy node and a structured retransmission opportunity.

Turning now to FIGS. 6-7, one can see some example methods when multicast transmission is assigned to a specific time period, also known as "Transmission opportunity (TXOP)". These methods relate to a network that includes a network controller (also called "master" or "domain master") and several slave nodes. The network master regulates the admission of the slave nodes to the network, and schedules respective time intervals during which each node can transmit data. Although these examples can be combined with the previously discussed protocols, these examples are different in that each node of a multicast group is informed by the network controller that it is expected to receive a data unit within a certain time interval reserved for that node. The nodes need to determine whether a data unit is, in fact, received during that reserved time interval and, if so, what is the duration of the data unit.

Accordingly, FIG. 6 shows an example where the first time slot 120 and second time slot 122 may be subdivided into separate time slots that are respectively reserved for transmission by different nodes associated with the network 100. For example, Node A has its own first time slot 122A, which is reserved exclusively for transmission of ACK or CONF messages or signals by Node A. Similarly, Node A has its own second time slot 122A, which is reserved exclusively for transmission of NACK messages or signals by Node A. This type of structured communication may simplify control within the nodes compared to previous embodiments, however, it has a disadvantage in that this type of well defined structure may result in lower overall data throughput, due to the increased overhead necessary for the potentially large number of reserved time slots.

FIG. 7 shows another example, where Node D discerns that a data unit 112a was transmitted only by detecting the preamble (P) because the transmission of the unit is in a TXOP dedicated for the data unit the node is supposed to receive. However, because the header of the received data unit 112a-3* is corrupted, Node D doesn't know when the data unit ends and thus doesn't know when to send a NACK. In FIG. 7 we assume that ACK is not a data unit, as in previous cases, but just a signal, the same as NACK in this example. The use of a signal is logically sufficient, and can save some time on the medium because a signal can typically have a shorter duration than a data unit.

One simple way for Node D to resolve the problem of not knowing when the data unit ends is to set a predefined time unit $T_M$, which is measured from the start of the received preamble. If no data unit is detected after the preamble and prior to the expiration of $T_M$, A NACK can be sent after $T_M$ expires.

Another way for Node D to resolve the problem of not knowing when the data unit ends is to continuously monitor for the ACK signal 118. If a node detects the ACK signal 118, it sends a NACK T2 time units after detecting the ACK signal (NACK-1 in FIG. 7). If no ACK signal was detected, nodes that didn't receive the data unit will continue to monitor for NACK from the other nodes that received the data unit in error (e.g., Node C in FIG. 7). If a node detects a NACK in this manner, the node may either stay idle, or may transmit its own NACK signal after the detected NACK signal (NACK-2 in FIG. 7). In practical implementations, NACK and ACK can be the same physical signals. If neither ACK no NACK has been detected, the node may issue a NACK after the timedata unit $T_M$. The source node retransmits the data unit if it detects the NACK signal.

Although the illustrated examples show a limited number of retransmission/acknowlegement cycles (e.g., one retransmission/acknowledgement cycle 304), additional re-transmission/acknowledgement cycles can be carried out to facilitate reliable data transfer. In addition, it will be appreciated that in some practical implementations nodes may vary dynamically between being a source node (e.g., unicast source and/or multicast mode) and a destination node (e.g., proxy node and/or other destination node) at various times during communication so that the nodes can exchange data in coordinated fashion. In addition, although a single proxy node is shown in the illustrated example, more than one node can be a proxy node at a given time in the network. Although not explicitly shown in the figures, multicast transmission also includes broadcast transmission, where the multicast group includes all nodes in the network (e.g., Nodes B, C, D and E).

Now that several examples of several systems have been discussed, a method in accordance with aspects of the invention are now described with reference to FIG. 8. The previously described nodes include suitable circuitry, state machines, firmware, software, logic, etc. to perform the various methods and functions illustrated and described herein, including but not limited to the methods described below. While the methods illustrated below are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated acts or events may be required to implement a methodology in accordance with the present invention.

Figure 8:
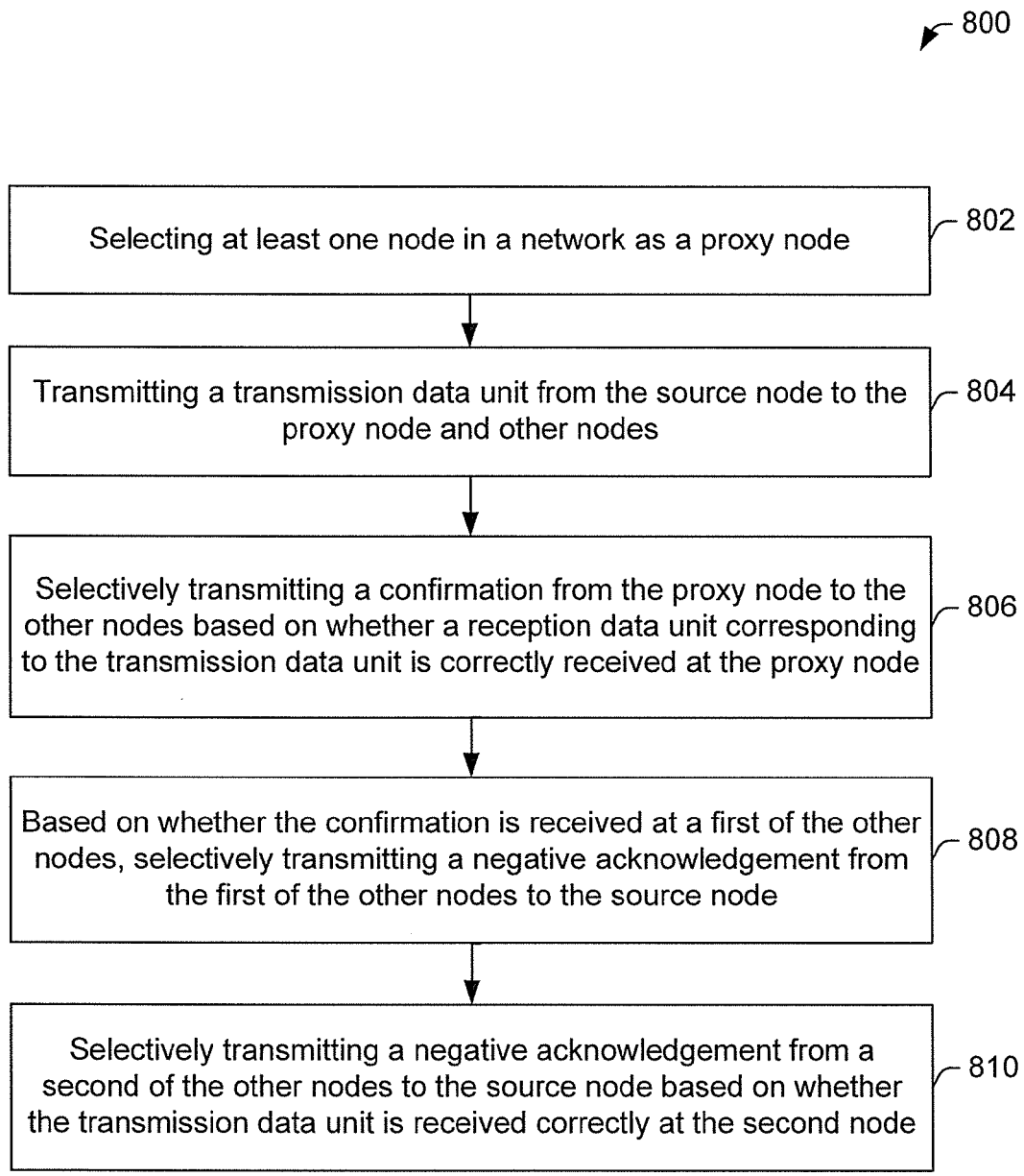
FIG. 8 shows a method in flowchart format in accordance with one embodiment.

Referring now to FIG. 8, one can see that method 800 starts at 802, where a proxy node is selected from among multiple nodes associated with a network. In some embodiments the proxy node is selected, for example, by analyzing communications in the network, and selecting the proxy node to have a communication characteristic that is less than that communication characteristic for the other nodes. For example, in one embodiment the node with the lowest signal-to-noise ratio relative to communications from the source node can be chosen as the proxy node, while in another embodiment the node that receives the most errant bits during some training period can be selected as the proxy node. In some embodiments more than one proxy nodes can be selected.

At 804, a transmission data unit is transmitted from the source node to the proxy node and other nodes of a multicast group. In case of a broadcast, the multicast group can include all other nodes in the network.

At 806, a confirmation message is selectively transmitted from the proxy node (or each proxy node if more than one selected) to the other nodes of the multicast group. This confirmation message is selectively transmitted based on whether a reception data unit corresponding to the transmission data unit is correctly received at the proxy node. In the case of a broadcast, the confirmation message can be transmitted to all other nodes in the network.

At 808, based on whether the confirmation message is received at a first of the other nodes, a first negative acknowledgement is selectively transmitted from the first of the other nodes to the source node.

At 810, a second negative acknowledgement is selectively transmitted from a second of the other nodes to the source node. This second negative acknowledgement is selectively transmitted based on whether the transmission data unit is received correctly at the second node.

While examples of the disclosure have been illustrated and described with respect to one or more implementations, alterations and/or modifications may be made to the these examples without departing from the spirit and scope of the appended claims. For example, in some embodiments features can be implemented as hardware modules, but in other embodiments the features can be performed by appropriate software routines or a combination of hardware and software. In regards to software implementations, the software may be read from a "computer readable medium", which includes any medium that participates in providing instructions to a node or to digital circuitry associated with the node. Such a medium may take numerous forms, including but not limited to, non-volatile media, volatile media, and transmission media. Non-volatile media includes, but is not limited to: magnetic disks, flash disks, EEPROM, and optical disks such as CDs or DVDS. Volatile media includes dynamic memory, including but not limited to: SRAM or DRAM. Transmission media includes, but is not limited to: coaxial cables, copper wire, fiber optics, etc. Transmission media can also include electromagnetic waves, such as a voltage wave, light wave, or radio wave.

In regard to the various functions performed by the above described components or structures (units, nodes, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A device, comprising:
reception circuitry adapted to receive a data unit from a first node of a network and a confirmation message signal from a second, different node of the network, wherein the confirmation message signal indicates that the second node correctly received the data unit,
analysis circuitry adapted to determine a failure to correctly receive the data unit by the reception circuitry of the device; and
transmission circuitry adapted to transmit a negative acknowledgement signal to the first node in case the analysis circuitry determines the data unit has not been correctly received by the reception circuitry of the device and the confirmation message signal from the second node is received by the reception circuitry of the device;
wherein at least one of the reception circuitry, analysis circuitry, and transmission circuitry are implemented in hardware.

2. The device according to claim 1, wherein the received data unit was transmitted to both the device and the second node by the first node, and wherein the confirmation message signal indicates that the second node correctly received the data unit.

3. The device according to claim 1, wherein the failure occurs in case non-correctable data is present in the received data unit.

4. The device according to claim 1, wherein the failure occurs in case the device fails to determine that the data unit is intended for the device.

5. The device according to claim 1, wherein the failure occurs in case the device does not receive the data unit.

6. The device according to claim 1, wherein the data unit is transmitted in two or more bursts, and wherein the negative acknowledgement signal is sent if at least one of the bursts is not received correctly.

7. A device, comprising:
a processor;
reception circuitry adapted to receive a data unit from a first node of a network and a confirmation message signal from a second, different node of the network, wherein the confirmation message signal indicates that the second node correctly received the data unit;
analysis circuitry adapted to determine a failure to correctly receive the data unit by the reception circuitry of the device; and
transmission circuitry adapted to transmit a negative acknowledgement signal to the first node in case the analysis circuitry determines the data unit has not been correctly received by the reception circuitry of the device and the confirmation message signal from the second node is received by the reception circuitry of the device.

8. The device of claim 7, wherein at least one of the reception circuitry, analysis circuitry, and transmission circuitry are implemented at least partially with instructions that are executable by the processor.

9. The device according to claim 7, wherein the received data unit was transmitted to both the device and the second node by the first node, and wherein the confirmation message signal indicates that the second node correctly received the data unit.

10. The device according to claim 7, wherein the failure occurs in case non-correctable data is present in the received data unit.

11. The device according to claim 7, wherein the failure occurs in case the device fails to determine that the data unit is intended for the device.

12. The device according to claim 7, wherein the failure occurs in case the device does not receive the data unit.

13. The device according to claim 7, wherein the data unit is transmitted in two or more bursts, and wherein the negative acknowledgement signal is sent if at least one of the bursts is not received correctly.

* * * * *